Figure 1:
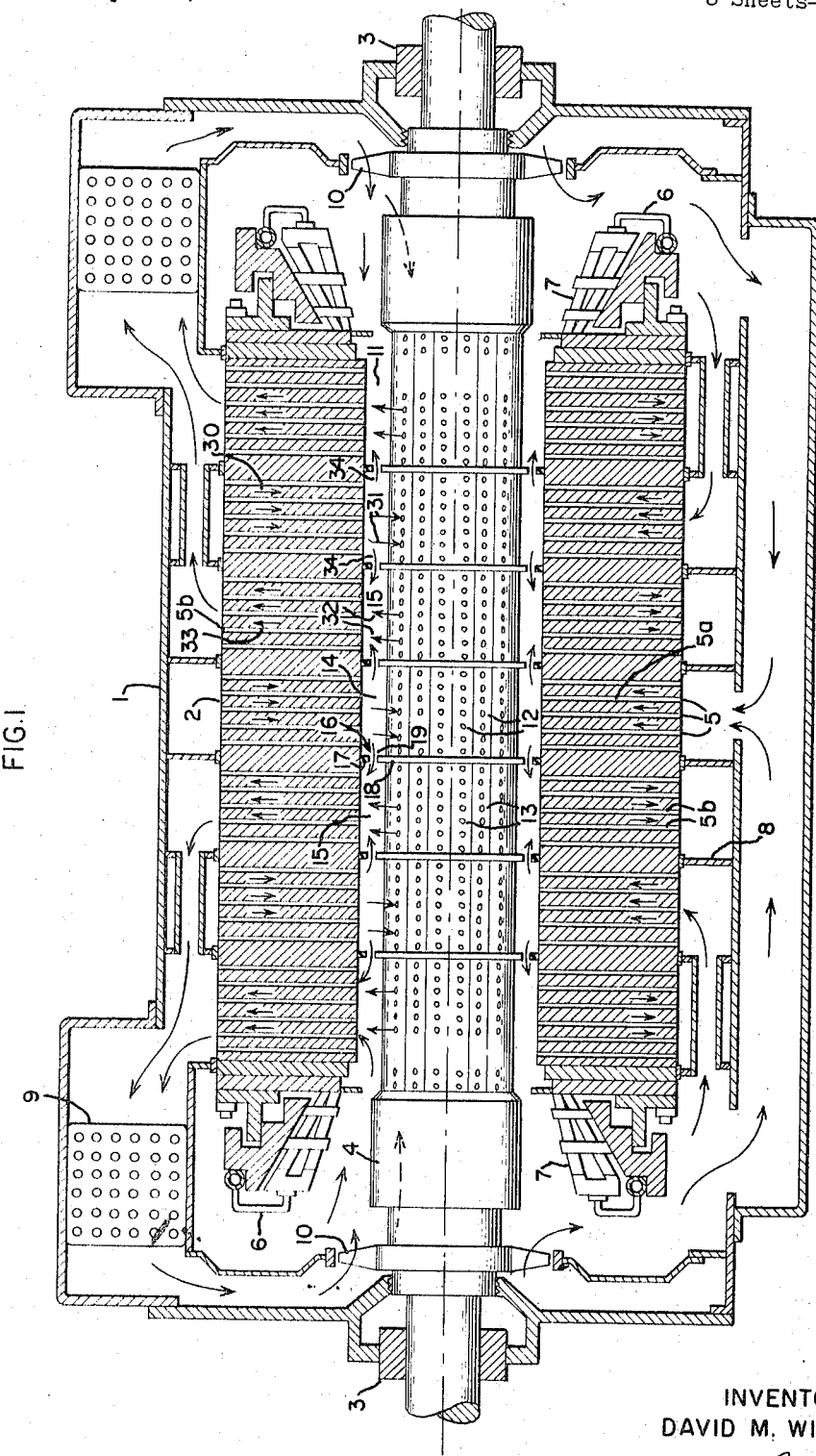

Oct. 17, 1967   D. M. WILLYOUNG   3,348,081
GAP PICKUP ROTOR WITH GAS SEGREGATING BAFFLES
Filed Sept. 16, 1965   3 Sheets-Sheet 3

INVENTOR:
DAVID M. WILLYOUNG,
BY W. C. Crutcher
HIS ATTORNEY.

United States Patent Office 3,348,081
Patented Oct. 17, 1967

3,348,081
GAP PICKUP ROTOR WITH GAS SEGREGATING BAFFLES
David M. Willyoung, Scotia, N.Y., assignor to General Electric Company, a corporation of New York
Filed Sept. 16, 1965, Ser. No. 487,798
9 Claims. (Cl. 310—55)

This invention relates to an improved gas-cooled dynamoelectric machine and more particularly to a gas-cooled generator of the type wherein coolant flow through conductors in the rotor is produced by pumping action of the rotor itself, using the gap pickup principle.

It has been known for some time that generator field windings on large turbine-generators can be successfully cooled by constructing the rotor so that gas is scooped from the air gap between the rotor and stator and circulated through internal rotor passages in order to cool the windings, as disclosed in U.S. Patent 2,664,512—Huntley. It is also well known to dispose the gap pickup inlet and outlet holes along the rotor in groups to provide inlet zones and outlet zones and to conduct the gas through the rotor from inlet zone holes to outlet zone holes through diagonal passages formed by elongated holes in the field conductors as disclosed in U.S. Patent 2,986,664—Willyoung et al. In such cases it has been the practice to constantly replace the gas in the air gap with cooler gas by means of radial ducts in the stator core. This cool gas serves to cool the stator iron itself. In such cases, the stator windings are separately cooled by liquid coolant passing through hollow strands of the windings.

Since the foregoing cooling arrangement employs multiple cooling paths and low pressure differentials, low pressure fans are commonly employed to circulate the gas through the various passages and through the heat exchangers which recool the gas.

It has been suggested that the well-known benefits of multiple path rotor cooling obtained with gap pickup rotors might also be achieved by employing rotating seals so as to form pressure barriers creating alternate zones of high and low pressure along the air gap to force cooling gas through passages in the windings without the benefit of gap pickup. However, this arrangement requires a high pressure blower to obtain the necessary pressure differential to force the gas through the rotor passages from one zone to the next since the gas is not caused to flow by the natural pumping action of the rotor.

It has been found in the case of rotors using the aforementioned gap pickup cooling principle, that a portion of the hot gas discharging from the rotor outlet ducts has found its way back to the rotor inlet ducts along the open air gap, thereby lowering the effectiveness of the cooling arrangement. While the detailed structure of this flow is not entirely understood, it is believed that the hot gas jets discharging from the rotor outlet ducts with high tangential velocity impinge on the stator and set up vortices and eddy cells of high level turbulence, a portion of which has sufficient axial momentum to overcome the low level pressure gradient existing along the air gap from core inlet region to core outlet region, as established by the low pressure fans. These vortices carry hot rotor gas axially along the air gap back to the rotor inlet pickup holes. It is undesirable to use rotating seals in the air gap to prevent this recirculation since this would appreciably and unnecessarily raise the fan pumping pressure and power and it would also prevent the desired volume of cool gas flow along the air gap from stator inlet ducts to stator outlet ducts.

Accordingly, one object of the present invention is to provide an improved gap pickup cooling arrangement with means to prevent the portion of the gas which has passed through the rotor cooling ducts from recirculating back along the air gap to reenter the rotor inlet holes.

Another object of the invention is to provide an improved gap pickup rotor with means for preventing hot rotor discharge gas from flowing axially along the air gap without impeding the flow of cool inlet gas axially along the air gap.

Figure 2:
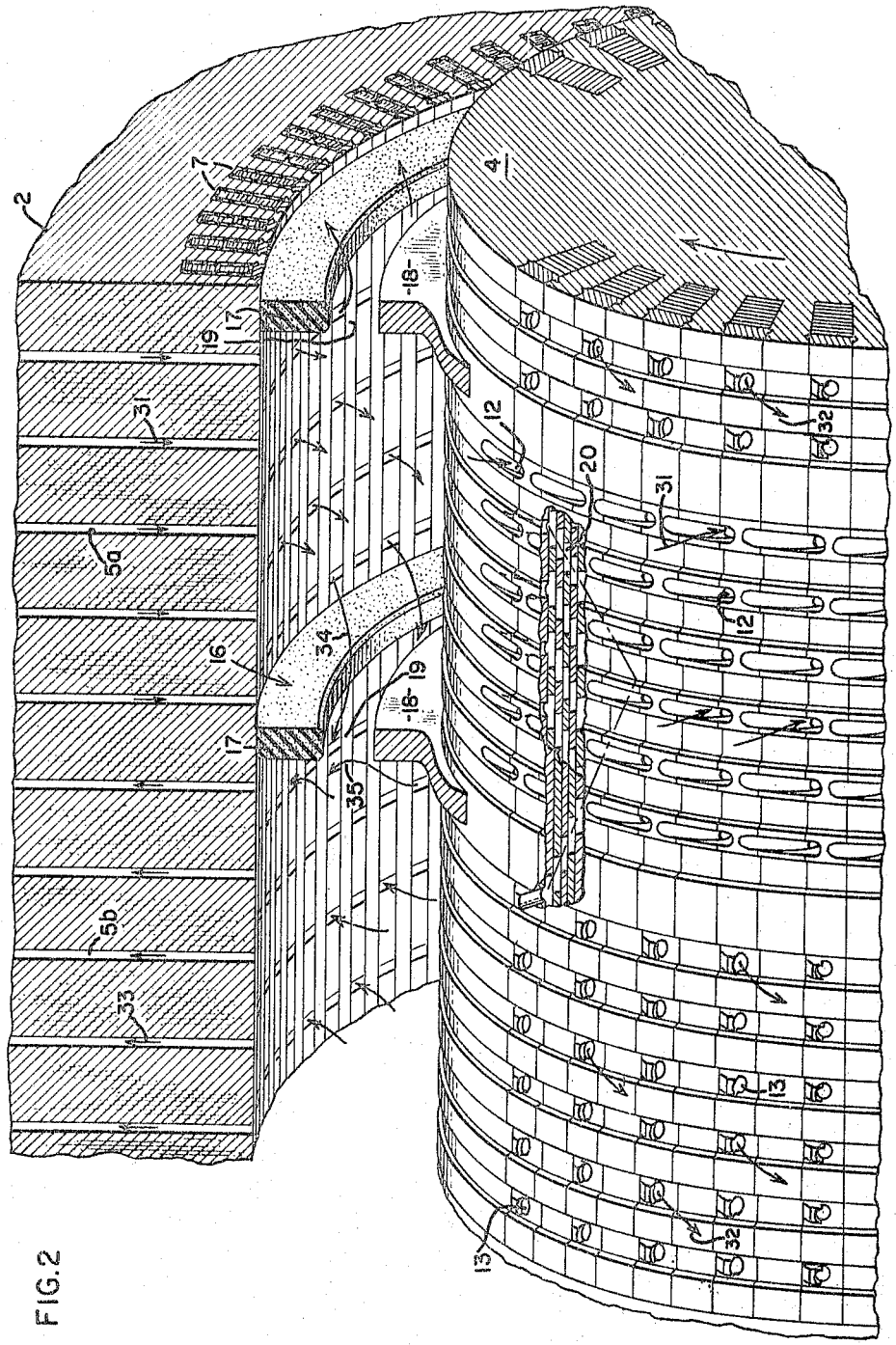
Figure 3:
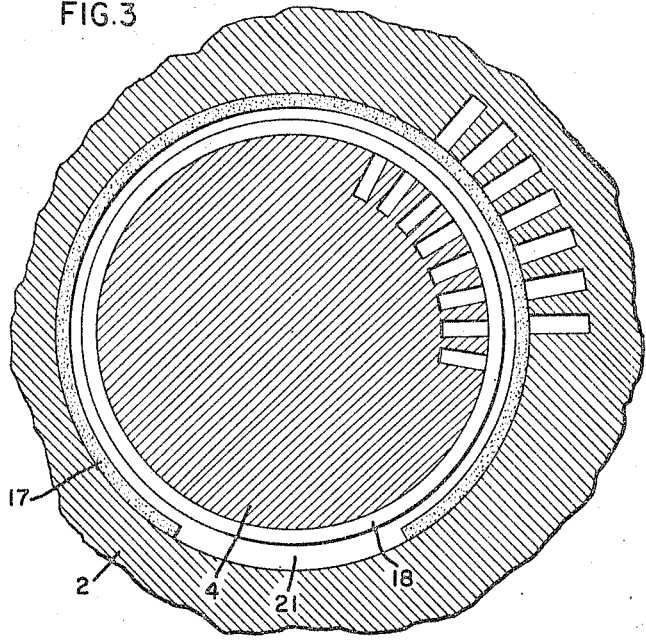
Figure 4:
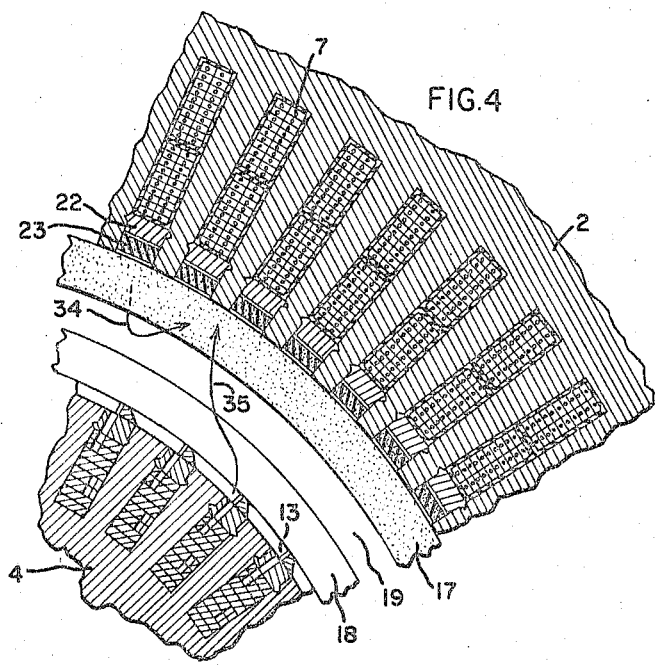

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

FIG. 1 is a composite plan and elevation view, partly in section, of a large hydrogen cooled generator with gap pickup rotor cooling, FIG. 2 is an enlarged perspective showing gas flow in the air gap, FIG. 3 is a simplified cross section looking axially along the rotor axis, FIG. 4 is an enlarged transverse cross section showing details of the air gap and vicinity.

Briefly stated, the invention is practiced by providing a series of partially open baffles in the air gap between the rotor inlet and outlet zones arranged so as to intercept a large portion of the gusts of hot rotor discharge gas which would otherwise move "upstream" to mix with the rotor inlet gas, at the same time intensifying the velocity of the opposing stream of cold gas through the baffle openings along the air gap to further impede the recirculation of hot rotor gas.

Referring now to FIG. 1 of the drawing, the upper half of the drawing is a plan view while the lower half is an elevation view rotated 90° into the plane of the drawing. The dynamoelectric machine comprises a gas tight casing 1 supporting a laminated stator core 2 and having bearings 3 supporting a rotor 4 for rotation therein. The stator core 2 is composed of laminations defining therebetween a number of radial cooling ducts 5 spaced along the stator core. The stator windings themselves are cooled by liquid supplied through insulating hoses 6 to the stator winding 7 and the liquid is recirculated and cooled in an external system not shown and not material to the present invention.

Partitions, such as 8, between the stator casing and stator core, divide the casing into compartments serving to isolate radially in-flowing gas coolant such as hydrogen, from radially out-flowing gas coolant as indicated by the flow arrows. The gas is circulated through the casing and through heat exchangers 9 by means of low pressure fans 10 on either end of the rotor.

Rotor cooling is accomplished in a known manner by taking gas from the air gap 11 through scoop-like inlet holes 12 and discharging it back to the air gap through outlet holes 13. Inlet holes 12 on the rotor are grouped along an inlet zone 14 generally aligned with a group of radial stator ducts 5a carrying inwardly flowing gas. Similarly, discharge holes 13 are grouped along an outlet zone 15 which is aligned with radial stator ducts 5b carrying outwardly flowing gas. Gas moves longitudinally along the rotor between each inlet 12 and outlet 13 by means of a flow passage extending diagonally down to the bottom of the rotor slot and then diagonally outward again through holes formed in the conductor, as set forth in the aforesaid Willyoung Patent 2,986,664.

Spaced along the air gap 11 are flow-dividing baffles shown generally as 16 and having a stationary portion 17 and a rotating portion 18. Defined between portions 17 and 18 is a generally annular gap 19.

Referring now to FIG. 2 of the drawing, the details of the flow-dividing baffle and the air gap may be seen more clearly. Stationary portion 17 is a suitable radially extending non-magnetic baffle member attached to the bore of the stator and preferably extends only around the top 300° or so of the stator bore. The rotating portion 18 is preferably a non-magnetic steel ring shrunk to the rotor surface so as to rotate therewith. It will be noted that inlet holes 12 are substantially flush with the rotor surface and are contoured so as to convert the relative motion between gas and rotor into a pressure head for forcing the gas through the winding by rotor pumping action. The outlet holes 13 are also flush and are shaped to contribute to the pumping by venturi action. A portion of one of the rotor slots is broken away in FIG. 2 to indicate diagonal flow passages for conducting the gas between an inlet 12 and an outlet 13 through diagonally-aligned holes in the conductor strands, one of which is indicated at 20.

Referring now to FIG. 3 of the drawing, it will be observed that the stationary portion 17 of the flow-dividing member extends approximately 300° over the top part of the stator bore, leaving an open space 21 at the bottom. This is desirable in order to provide a construction in which the baffles on the stator and rotor can be permanently and securely mounted, leaving space to slide the rotor into the stator bore on a skid in the normal manner without damaging the stationary portion 17 or the rings 18.

Reference to FIG. 4 of the drawing indicates a suitable means of attaching the stationary portion 17 to the stator core 2. Member 17 may be made of foam rubber and is secured to conventional wedge members 22 by means of intermediate foam rubber blocks 23 cemented between the wedges 22 and the member 17. Blocks 23 can either be attached to the wedges before attaching member 17, or they can be preassembled to member 17 before it is inserted. FIG. 4 also indicates a portion of the rotating ring 18 and a group of rotor outlet ducts 13. Foam rubber is particularly applicable for stator baffle member 17 since major damage to the other parts of the generator structure will not occur if the rotor inadvertently bumps the baffle while it is being moved into position.

The operation of the invention will be described by reference to FIGS. 1, 2 and 4 of the drawing. Referring first to FIG. 1, it will be observed that radially inflowing gas represented by arrows 30 is supplied to air gap 11, and from there it is scooped into the rotor inlet ducts as indicated by arrows 31. The gas is pumped by the rotor through the diagonal flow cooling passages and leaves the rotor in outlet zone 15 as indicated by flow arrow 32. From there it flows radially outward from the air gap through the radial stator ducts 5b as shown by flow arrow 33.

In accordance with the invention, the introduction of the partially open baffle members 16 create restrictions in the air gap which intensify the axially moving streams of cool gas in opposing directions from inlet zones 14 toward outlet zones 15 through the gaps 19, as indicated by arrows 34. In previous constructions, it was possible for significant quantities of hot rotor gas, probably in the form of high energy eddies, to find their way from outlet zones 15 back into inlet zones 14. This hot gas would be recirculated through the rotor, thereby reducing the effectiveness of rotor cooling. The partially open baffles serve to intercept a portion of these eddies by physically blocking them. At the same time, the positive streams of cooling gas accelerated axially along the rotor through gaps 19 serve to further reduce such recirculated rotor outlet gas. This action is indicated in FIGS. 2 and 4 where it is shown that intensified streams of cooling gas through gap 19 serve to deflect and block high energy eddies of hot cooling gas shown by flow arrow 35.

The opposing streams of axially flowing air gap cooling gas 34 also serve to dilute and cool the hot gas coming from the rotor outlet holes 13 in the outlet zones 15 so that relatively cool gas is available to cool the stator laminations in the radial stator cooling ducts 5b.

The size of gap 19 may vary somewhat and still provide significant improvements in rotor capability. The gap should not be so small as to substantially raise the pressure difference between inlet and outlet zones such as to undesirably increase the requirements of the generator fan pumping pressure or to significantly increase the mean temperature of the gas in the air gap at the outlet zone which is used to cool the outlet section of the core. Since the gap pickup rotor flow is essentially independent of the baffle gap area 19, being determined by design of the rotor flow passages and surface configurations, the baffles 17 and 18 and gap area 19 may be proportioned to prevent the recirculation of the greatest portion of the outlet-to-inlet-moving hot gas eddies, while still employing large radial clearances and an open area 21 at the bottom of the stator core (FIG. 3).

It has been found that a suitable size of gap 19 is such as to provide a restriction of from 30% to 80% of the air gap area and preferably is on the order of 65% reduction in most size ranges. The foregoing preferable range of sizes of the air gap restriction includes the open area over the bottom portion of the stator as indicated in FIG. 3.

It will be understood that while the preferred form of the invention uses a stationary portion 17 and a rotating portion 18 acting together to form the baffle 16, the invention also encompasses stationary baffles alone or rotating baffles alone, such as would be provided by extending either member 17 or 18 and eliminating the other member.

While there has been described herein what is considered to be the preferred embodiment of the invention, it will be understood that various other changes will occur to those skilled in the art, and it is intended to cover in the appended claims all such modifications as fall within the true spirit and scope of the invention.

What I claim as new and desire to secure by Letters Patent of the United States is.

1. In a dynamoelectric machine of the type having an air tight casing filled with cooling gas, a stator core, a rotor defining an air gap with the stator core, and means for recirculating and cooling said gas inside the casing, the combination comprising:

> means defining a plurality of gas inlet ducts along an intake zone on the rotor arranged to scoop gas from the air gap due to rotation of the rotor,
>
> means defining a plurality of gas outlet ducts along an adjacent outlet zone on the rotor and connected by means of passages inside the rotor with said inlet ducts so as to discharge gas into the air gap,
>
> means defining a plurality of first radial ducts in the stator core furnishing gas to said inlet zone,
>
> means defining a plurality of second radial ducts in the stator core for conducting gas away from the air gap along the outlet zone, and
>
> a partially open baffle disposed between the inlet and outlet zones having radially extending portions defining a restricted annular opening for accelerating a stream of cool gas to flow through said opening from inlet zone to outlet zone, whereby said radial portions and said accelerated stream impede backward flow along the air gap from rotor outlet ducts to rotor inlet ducts.

2. In a dynamoelectric machine of the type having an air-tight casing filled with cooling gas, a stator core, a rotor defining an air gap with the stator core, and means for recirculating and cooling said gas inside the casing, the combination comprising:

> means defining a plurality of gas inlet ducts along an intake zone on the rotor arranged to scoop gas from the air gap due to rotation of the rotor,
>
> means defining a plurality of gas outlet ducts along spaced first and second outlet zones on either side of said rotor inlet zone and connected by means of passages inside the rotor with said inlet ducts so as to discharge gas into the air gap, means defining a first group of radial ducts in the stator core furnishing gas to said inlet zone, means defining second and third groups of radial ducts in the stator core for conducting gas away from the air gap, said second and third groups being spaced on either side of the first group of radial inlet ducts, and first and second partially open baffles disposed in the air gap on either side of said inlet zone, said baffles having radially extending portions defining first and second restricted annular openings for accelerating streams of cool gas to flow axially in opposite directions through said openings from the first group to the second and third group respectively, whereby said radial portions and said accelerated streams impede axial flow along the air gap from the outlet zones toward said inlet zone.

3. In a dynamoelectric machine of the type having an air-tight casing filled with cooling gas, a stator core, a rotor defining an air gap with the stator core, and means for recirculating and cooling said gas within the casing, the combination comprising:

means defining a plurality of gas inlet ducts along first and second spaced intake zones on the rotor, said inlet ducts being arranged to scoop gas from the air gap due to rotation of the rotor, means defining a plurality of gas outlet ducts along an outlet zone on the rotor disposed between said inlet zones and connected by means of passages inside the rotor so as to discharge gas into the outlet zone of the air gap from both of said inlet zones, means defining first and second groups of radial ducts in the stator core generally aligned with said inlet zones and furnishing gas to the air gap, means defining a third group of radial ducts in the stator core disposed between the first and second ducts for conducting gas away from the air gap, and first and second partially open baffles disposed between the inlet and outlet zones, said baffles having radially extending portions defining first and second restricted annular openings for accelerating opposing streams of cool gas to flow toward one another axially through the openings from said first and second group toward said third group, whereby said radial portions and said accelerated streams impede hot rotor gas from flowing axially along the air gap in the opposite direction from the outlet zone toward the inlet zones.

4. In a dynamoelectric machine of the type having an air-tight casing filled with cooling gas, a stator core, a rotor defining an air gap with the stator core, and means for recirculating and cooling said gas inside the casing, the combination comprising:

means defining a plurality of gas inlet ducts on the rotor, means defining a plurality of gas outlet ducts on the rotor axially spaced from said inlet ducts, means defining a plurality of cooling passages inside the rotor windings connecting the inlet and outlet ducts, said ducts being arranged to pump gas from an inlet to an outlet zone defined in the air gap, means for furnishing cooling gas to the air gap along said inlet zone, means for conducting gas away from the air gap along the outlet zone, and baffle means having radial portions defining a restricted annular opening between inlet and outlet zones for accelerating a stream of cool gas through said opening from inlet to outlet zone in an axial direction whereby said radial portions and said accelerated stream impede flow of hot gas in an opposite direction.

5. The combination according to claim 4, wherein said baffle means comprises a radially extending rotating ring attached to the rotor.

6. The combination according to claim 4, wherein said baffle means comprises a radially extending stationary baffle disposed only around the top and side portions of the stator bore.

7. The combination according to claim 6, wherein said baffle means includes a rotating ring on the rotor cooperating with said radially extending baffle to define said restricted annular opening.

8. The combination according to claim 4, wherein said restricted annular opening has a cross sectional area of from 30% to 80% of the cross sectional area of the air gap proper.

9. The combination according to claim 4, wherein said restricted annular opening has a cross sectional area on the order of 65% of the cross sectional area of the air gap proper.

References Cited

UNITED STATES PATENTS 3,110,827  11/1963  Baudry _____ 310—55
3,265,912  8/1966  Baudry _____ 310—55

MILTON O. HIRSHFIELD, *Primary Examiner.*

L. L. SMITH, *Assistant Examiner.*